Sept. 20, 1949.   J. P. LAIRD, JR   2,482,115
OPTICAL PROJECTOR AND SYSTEM
Filed Oct. 18, 1945

INVENTOR.
Joseph P. Laird Jr.
BY
Ralph L Chappell
ATTORNEY

Patented Sept. 20, 1949

2,482,115

UNITED STATES PATENT OFFICE 2,482,115

OPTICAL PROJECTOR AND SYSTEM

Joseph P. Laird, Jr., United States Navy

Application October 18, 1945, Serial No. 623,165

1 Claim. (Cl. 88—24)

(Granted under the act of March 3, 1883, as amended April 30, 1928; 370 O. G. 757)

The present invention concerns projection of an optical image. Particularly, the present invention concerns an apparatus, optical system and method for projecting an optical image that creates in the observer an illusion that the object being viewed is at great distance from such observer.

A preferred form of the invention finds use in training devices used in connection with aviation. For example, in torpedo and rocket attack trainers of the type wherein a mock aircraft fuselage is mounted in stationary position and mock flight controls and instruments are provided so that the trainee can simulate actual flight conditions, it is necessary that there be presented to the view of the trainee an optical panorama image simulating the sky, clouds, land and water that would be seen under actual flight conditions. By correlating changes in the simulated panorama image with changes in the mock controls operated by the trainee it is possible to produce the illusion of actual flight. For example, if the mock controls are manipulated to simulate straight and level flight the panorama image should show a level horizon and appropriate features of sky, clouds, land and water formations. If the controls are manipulated to simulate a dive, correlated movement of the panorama image should cause a rise in horizon level to produce the illusion of the aircraft nose dropping as in a dive. Thus by proper correlation an appropriate simulated panorama image can be created for any flight attitude that the trainee simulates by operation of the mock flight controls and changes in simulated attitude can be correlated with changes in the panorama image.

An image of the type described that simulates sky, clouds, land and water formations as viewed in aircraft flight must satisfy certain requirements. It is necessary that the image produce the illusion that the objects being viewed are at great distance and in some cases even appear to be near infinity. Thus certain cloud and ground formations should appear at a distance of many miles from the observer while other objects such as those proximate the horizon should appear to be at almost infinite distance. Also it is preferable that objects in relatively close proximity have a depth or three-dimensional appearance while objects at relatively great distance seem flat and have a two-dimensional appearance, as is the case where actually viewing a panorama from an aircraft in flight. Further, it is necessary that if the observer's eyes are moved somewhat from the normal position of observation in the mock cockpit there shall not be an appreciable distortion of the image. Where the panorama image is three dimensional, it is essential that movement of the observer's eyes from the normal observation point shall result in proper apparent relative movement between near and distant objects.

An object of the present invention is to provide an apparatus, optical system and method for projecting an optical image.

Another object is to project an optical image that creates in the observer an illusion that the object being viewed is at great distance.

Another object is to project an optical image in which portions of the image appearing at a relatively great distance appear to be flat or two-dimensional, while portions of the image appearing in relatively close proximity appear to have depth or be three-dimensional.

Another object is to project an optical image of such aspect that, when the observer's eyes are moved from the normal point of observation, there is not any appreciable distortion of the image.

Another object is to project an optical image of such aspect that movement of the observer's eyes from the normal point of observation results in proper apparent relative movement between apparently near and apparently distant objects in any part of the image that is three-dimensional.

Further objects and advantages of this invention, as well as its construction, arrangement and operation, are apparent from the following description and claim in connection with the accompanying drawings, in which, Fig. 1 is a diagrammatic view of an optical system forming a preferred embodiment of the present invention;

Figures 1, 2:
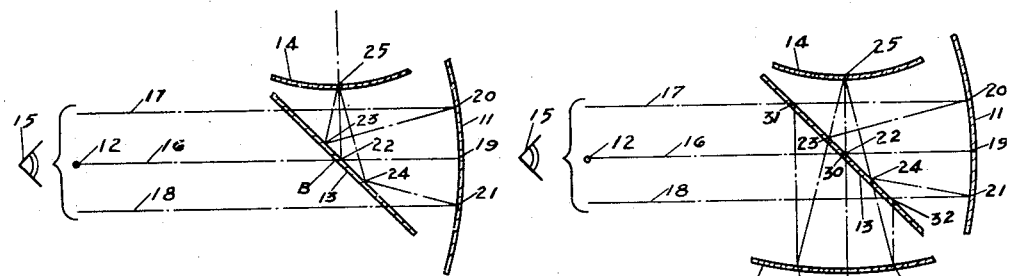
Fig. 2 is a diagrammatic view of an optical system forming a modified embodiment of the present invention.

There is shown diagrammatically in Fig. 1 a concave spherical mirror 11 that is completely reflecting and has a center of curvature 12. A flat partially reflecting mirror is shown at 13 and this mirror has the property of partially transmitting and partially reflecting light rays projected upon it. A spherical object surface 14 completes the optical elements of the system and object surface 14 has a radius of curvature equal to one-half that of mirror 11. An observer's eye is indicated at 15.

The optical proprieties of a concave spherical mirror are such that a small bundle of collimated light rays projected onto the mirror from the center of curvature are brought to a focus at a point which is one-half the radius of curvature from the mirror surface to the center. Conversely, if a point source of light is located at a point midway between the center of curvature and the surface of the concave spherical mirror, some of the rays are reflected as a collimated bundle from the mirror and pass through the center of curvature. Rays that are so reflected that they pass to one side of the center of curvature are only very slightly out of parallel with the ones passing through the center and this is caused by the phenomenon known as spherical aberration.

Thus in Fig. 1 a light ray 16 that passes through the center of curvature and parallel rays 17 and 18, which together form a bundle of collimated rays, can pass from the center of curvature through partially reflecting mirror 13 and be projected upon spherical mirror 11. These rays are reflected at points 19, 20 and 21 respectively, in such manner that they would normally reach a focal point halfway between center of curvature 12 and spherical mirror 11. Before reaching such focal point, however, the rays are reflected by mirror 13 from points 22, 23 and 24 respectively to converge at focal point 25 upon object sphere 14. Thus the focal point for rays 16, 17 and 18 is removed by the action of mirror 13 to one side of the path travelled by the rays when being projected upon spherical mirror 11. Similar bundles of collimated rays passing through center of curvature 12 in various directions are likewise reflected from spherical mirror 11 and partially reflecting mirror 13 to become focused upon various points of object sphere 14 and to form a complete spherical image thereon.

Conversely, considering point 25 as a light source, rays can emanate therefrom to be reflected from mirror 13 at points 22, 23 and 24 and projected upon spherical mirror 11 at points 19, 20 and 21 respectively. From the spherical mirror the rays are projected in parallel relationship at 16, 17 and 18 toward the center of curvature 12 with ray 16 passing directly therethrough. If light emanates from points that completely cover object sphere 14, bundles of collimated rays similar to 16, 17 and 18 are projected through the center of curvature 12 in various directions so that an observer placing an eye 15 at the center of curvature 12 sees a complete image of the spherical object 14a depicted upon object sphere 14, for example, a panorama of sky, clouds, land and water. Since the bundles of light rays passing through center of curvature 12 are collimated it appears to the observer that the object being viewed is at great distance.

Mirror 13 unavoidably diminishes the brilliance of the image being viewed at 15 since some of the rays of light emanating, for example, from point 25 on the object sphere, are transmitted through mirror 13 instead of being reflected therefrom toward spherical mirror 11. An arrangement for overcoming this decrease in brilliance is shown in Fig. 2. In this arrangement the optical elements are similar to those indicated in Fig. 1 and like elements have like reference characters. The distinguishing feature of the arrangement in Fig. 2 is the provision of a second spherical mirror 26 disposed beneath object sphere 14 in such position that rays of light transmitted by mirror 13 are reflected from points such as 27, 28 and 29 on spherical mirror 26 back toward mirror 13, and in turn reflected from points 30, 31 and 32 toward center of curvature 12.

A distinguishing feature of the optical system is the symmetry of the system whereby with the observer's eye 15 effectively at the center of curvature 12 of the spherical mirror, every radius of the spherical mirror becomes a main optical axis and hence distortion of the image being viewed at 15 is at a minimum. Another distinguishing feature is the fact that the observer's eye can be moved a reasonable distance from the center of curvature 12 without losing the image or causing appreciable distortion thereof. A further distinguishing feature is the fact that the rays of light passing through the center of curvature 12 can be in slightly non-collimated relation without appreciably distorting the projected image. This effect occurs, for example, when a three-dimensional image is projected.

While the optical systems of Figs. 1 and 2 have been described principally in connection with projecting at the center of curvature 12 an image of the object sphere 14, the system can be reversely used, for example, as a camera, by sensitizing the surface of object sphere 14 to make a record of light rays that enter the system through the center of curvature 12 and are brought to a focus upon the sphere 14. For example, if desired, the surface of sphere 14 can be sensitized and a panorama record made of sky, clouds, land and water as photographed from an aircraft in flight. The developed image of sphere 14 can then be used in a training aid apparatus as described in connection with Figs. 1 and 2 to project an image at center of curvature 12 so that an observer views an image of the panorama.

Figure 3:
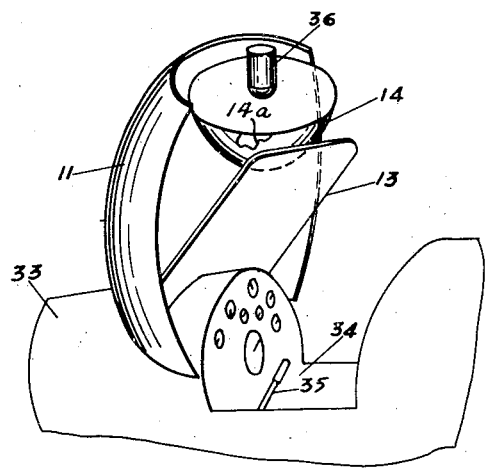
Fig. 3 is a perspective view illustrating the optical system of Fig. 1 incorporated in an aviation training aid apparatus.

Fig. 3 is a schematic showing of the optical system of Fig. 1 as applied to a training-aid apparatus used in connection with aviation. Similar reference characters are used to indicate similar parts in Figs. 3 and 1. This embodiment includes a mock aircraft fuselage 33 having cockpit 34 and mock flight controls 35. Spherical mirror 11, partially reflecting mirror 13, object sphere 14 and a lamp 36 disposed within object sphere 14 complete the construction. Object 14 is shown as being a hemisphere and lamp 36 is disposed to illuminate the hemisphere from within. Object hemisphere 14 can provide a translucent spherical surface, and lamp 36 can project an image thereon. If desired, an image can be painted on the surface of hemisphere 14, and lamp 36 used to illuminate the image from within or an opaque image can be provided on sphere 14. In any event, the view presented on the surface of the object hemisphere 14 is projected as described in connection with Fig. 1 by light rays in collimated relation toward the center of curvature of spherical mirror 11 that is located at the point where the eye of the trainee in fuselage 33 is located.

Figure 4:
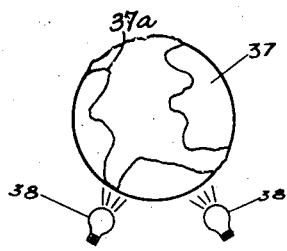
Fig. 4 is a diagrammatic view illustrating a modified form of the object sphere forming part of the present invention.

In Fig. 4 is shown an alternate form of object sphere 37 in which a complete sphere is provided. This sphere is provided with a three-dimensional panorama 37a, similar to a relief map. When projected by means of the optical system as described in connection with Fig. 1, the image viewed by the observer at the center of curvature 12 of mirror 11 has a three-dimensional or depth effect that is particularly effective in connection with portions of the image that it is desired shall appear relatively close to the observer. Lights 38 for illuminating object sphere 33 are provided.

Object sphere 14 and object sphere 37 can be actuated by apparatus and in a manner disclosed for example in the patent to Lucien J. Beindorf, No. 2,336,436, issued December 7, 1943, for Sphere rotating and controlling apparatus.

Since object sphere 14 can be rotated relative to the other elements of the apparatus it is possible to present to an observer's eye at 15 an image of a changing panorama. Correlation of movement between mock controls 35 and object sphere 14 provides a panorama image that changes to correspond with changes in simulated flight attitudes effected by means of mock controls 35.

While a preferred embodiment of the invention has been described in connection with an aviation training aid apparatus various other embodiments and uses are possible in which the optical system can be incorporated to operate either as a camera or as a projector.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

An optical system comprising a concave spherical mirror, a flat partially reflecting mirror disposed between said spherical mirror and the focal point thereof, and a spherical surface disposed to one side of a path from said spherical mirror through said flat mirror, whereby rays of light in the system will at one optical extremity of the system define focal points at said spherical surface and at the other optical extremity of the system will be in substantially collimated relation and pass through the said curvature of said mirror, and a second spherical mirror having a radius substantially equivalent to that of the first spherical mirror and disposed concentrically with respect to said spherical surface.

JOSEPH P. LAIRD, Jr.

REFERENCES CITED

The following references are of record in the file of this patent:

UNITED STATES PATENTS

| Number | Name | Date |
|---|---|---|
| 1,812,110 | Meyerhoff | June 30, 1931 |
| 1,874,279 | Geromanos | Aug. 30, 1932 |
| 2,081,969 | Allen et al. | June 1, 1937 |
| 2,289,877 | Dreyer | July 14, 1942 |
| 2,313,204 | Morelle | Mar. 9, 1943 |
| 2,336,436 | Beindorf | Dec. 7, 1943 |
| 2,352,101 | Hutter | June 30, 1944 |
| 2,358,316 | Chwalow | Sept. 19, 1944 |

FOREIGN PATENTS

| Number | Country | Date |
|---|---|---|
| 400,182 | France | May 23, 1909 |